United States Patent
Morrison et al.

(10) Patent No.: US 12,186,975 B2
(45) Date of Patent: Jan. 7, 2025

(54) METHOD AND EXTRUSION APPARATUS FOR EXTRUSION OF FIBER-REINFORCED PLASTIC MATERIAL FOR THE ADDITIVE MANUFACTURE OF A COMPONENT

(71) Applicant: AIM3D GmbH, Rostock (DE)

(72) Inventors: Vincent Morrison, Krakow am See (DE); Clemens Lieberwirth, Rostock (DE); René Zielke, Rostock (DE); Robert Radon, Rostock (DE); Tim Weidner, Rostock (DE)

(73) Assignee: AIM3D GmbH, Rostock (DE)

( * ) Notice: Subject to any disclaimer, the term of this patent is extended or adjusted under 35 U.S.C. 154(b) by 339 days.

(21) Appl. No.: 17/633,375

(22) PCT Filed: Aug. 8, 2019

(86) PCT No.: PCT/EP2019/071342
§ 371 (c)(1),
(2) Date: Feb. 7, 2022

(87) PCT Pub. No.: WO2021/023389
PCT Pub. Date: Feb. 11, 2021

(65) Prior Publication Data
US 2022/0288842 A1 Sep. 15, 2022

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/295* (2017.08);
(Continued)

(58) Field of Classification Search
CPC ... B29C 64/106; B29C 64/314; B29C 64/321; B29C 64/295; B29C 64/118;
(Continued)

(56) References Cited

U.S. PATENT DOCUMENTS

| 5,121,329 A | 6/1992 | Crump |
| 9,370,896 B2 | 6/2016 | Thomas |

(Continued)

FOREIGN PATENT DOCUMENTS

| CN | 1373036 A | 10/2002 |
| CN | 105142876 A | 12/2015 |

(Continued)

OTHER PUBLICATIONS

Office Action for Japanese Application No. 2022-507689 (with English Translation), mailed on Apr. 11, 2023, 5 pages.

*Primary Examiner* — Galen H Hauth
*Assistant Examiner* — Lawrence D. Hohenbrink, Jr.
(74) *Attorney, Agent, or Firm* — Brake Hughes Bellermann LLP

(57) ABSTRACT

A method and an apparatus for extrusion of fiber-reinforced plastic material for the additive manufacture of a component is disclosed. The fiber-reinforced plastic material is supplied to the extrusion apparatus and heated in a heating zone of the extrusion apparatus in order to then supply the fiber-reinforced plastic material to an extrusion nozzle of the extrusion apparatus, at which a material thread comprising fiber-reinforced plastic material is extruded for the component to be manufactured. In order to convey the fiber-reinforced plastic material through the heating zone, a screw conveyor of the extrusion apparatus is utilized, which has a length-diameter ratio of less than a set value. In the heating zone a maximum volume is provided for the fiber-reinforced plastic (Continued)

material and a rotational speed of the screw conveyor is limited to a maximum of speed.

19 Claims, 4 Drawing Sheets

(51) Int. Cl.
| | |
|---|---|
| B29C 64/295 | (2017.01) |
| B29C 64/314 | (2017.01) |
| B29C 64/321 | (2017.01) |
| B33Y 10/00 | (2015.01) |
| B33Y 30/00 | (2015.01) |
| B33Y 40/10 | (2020.01) |
| B29C 48/02 | (2019.01) |
| B29C 48/05 | (2019.01) |
| B29C 48/25 | (2019.01) |
| B29C 48/285 | (2019.01) |
| B29C 48/30 | (2019.01) |
| B29C 48/395 | (2019.01) |
| B29C 48/625 | (2019.01) |
| B29C 48/68 | (2019.01) |
| B29C 48/797 | (2019.01) |
| B29C 48/80 | (2019.01) |
| B29C 64/118 | (2017.01) |
| B29C 64/393 | (2017.01) |
| B29K 101/12 | (2006.01) |
| B29K 105/12 | (2006.01) |
| B29K 309/08 | (2006.01) |
| B33Y 50/02 | (2015.01) |
| B33Y 70/10 | (2020.01) |

(52) U.S. Cl.
CPC .......... *B29C 64/314* (2017.08); *B29C 64/321* (2017.08); *B33Y 10/00* (2014.12); *B33Y 30/00* (2014.12); *B33Y 40/10* (2020.01); *B29C 48/02* (2019.02); *B29C 48/05* (2019.02); *B29C 48/25* (2019.02); *B29C 48/285* (2019.02); *B29C 48/30* (2019.02); *B29C 48/395* (2019.02); *B29C 48/625* (2019.02); *B29C 48/68* (2019.02); *B29C 48/797* (2019.02); *B29C 48/80* (2019.02); *B29C 64/118* (2017.08); *B29C 64/393* (2017.08); *B29K 2101/12* (2013.01); *B29K 2105/12* (2013.01); *B29K 2309/08* (2013.01); *B33Y 50/02* (2014.12); *B33Y 70/10* (2020.01)

(58) Field of Classification Search
CPC ....... B29C 64/393; B29C 48/02; B29C 48/05; B29C 48/25; B29C 48/285; B29C 48/30; B29C 48/395; B29C 48/625; B29C 48/68; B29C 48/797; B29C 48/80; B33Y 10/00; B33Y 30/00; B33Y 40/10; B33Y 50/02; B33Y 70/10; B29K 2101/12; B29K 2105/12; B29K 2309/08
USPC ......................................................... 264/241
See application file for complete search history.

(56) References Cited

U.S. PATENT DOCUMENTS

| | | | |
|---|---|---|---|
| 2015/0321419 A1 | 11/2015 | Linthicum et al. | |
| 2016/0200024 A1* | 7/2016 | Kim | B29C 48/832 |
| | | | 425/375 |
| 2017/0291364 A1 | 10/2017 | Womer | |
| 2020/0130231 A1* | 4/2020 | Rückborn | B29B 9/06 |

FOREIGN PATENT DOCUMENTS

| | | | | |
|---|---|---|---|---|
| CN | 105936119 A | 9/2016 | | |
| CN | 109414862 A | 3/2019 | | |
| DE | 102013002559 A1 | 8/2014 | | |
| DE | 102014018081 A1 | 6/2016 | | |
| DE | 112015002058 T5 | 1/2017 | | |
| DE | 102015223238 A1 | 5/2017 | | |
| DE | 102016013857 A1 | 5/2017 | | |
| DE | 102015122647 A1 | 6/2017 | | |
| DE | 102016208196 A1 | 11/2017 | | |
| DE | 102017114841 A1 * | 1/2019 | | B29B 9/06 |
| DE | 102018102731 A1 | 8/2019 | | |
| EP | 1063075 B1 | 8/2006 | | |
| JP | 2019018440 A | 2/2019 | | |
| JP | 2019098569 A | 6/2019 | | |
| WO | 2017202398 A1 | 11/2017 | | |
| WO | 2017212190 A1 | 12/2017 | | |
| WO | 2019007756 A1 | 1/2019 | | |

* cited by examiner

METHOD AND EXTRUSION APPARATUS FOR EXTRUSION OF FIBER-REINFORCED PLASTIC MATERIAL FOR THE ADDITIVE MANUFACTURE OF A COMPONENT

CROSS-REFERENCE TO RELATED APPLICATIONS

This application is the U.S. National Phase of PCT Application No. PCT/EP2019/071342 filed on Aug. 8, 2019, the disclosure of which is hereby incorporated in its entirety by reference herein.

TECHNICAL FIELD

The proposed solution relates to an extrusion method and an extrusion apparatus for extrusion of fiber-reinforced plastic material for the additive manufacture of a component.

BACKGROUND

Extrusion apparatuses, e.g., screw extruders, are used in the series production of components by injection molding and die casting. A screw conveyor, an injection nozzle, and a die may be disposed in a horizontal line relative to each other. The filling with material, which chiefly is present as granules or powder, in general is effected in the rearmost part of the screw extruder, in the so-called feed zone. The material is vertically guided onto the screw conveyor by a hopper that sits on a barrel section of the extruder. Due to a sufficiently large cross-section in the hopper, which prevents bridging, the material falls onto the screw conveyor driven by gravity and is drawn in by the same. In series production, so-called three-zone screw extruders are used in general, by which the material is drawn in and conveyed to the nozzle. The material is compressed, deaerated, and homogenized. Thereafter, a pressure is built up for filling the die.

The feed zone of the screw extruder may be configured as a barrel section in a housing of the screw extruder. A hopper is arranged on the barrel section and supplies material to the screw. Cross-sections of the barrel section and hopper are chosen so that bridging of the material present (in the form of granules) does not occur. This greatly depends on the angle of repose and the coefficient of friction of the bulk material used.

SUMMARY

Disclosed herein is an improved processing of fiber-reinforced plastic material for the additive manufacture. This is achieved with a method having features as described herein and an extrusion apparatus having features as described herein.

In an example method for extrusion of fiber-reinforced plastic material for the additive manufacture of a component, it is provided that the fiber-reinforced plastic material is supplied to an extrusion apparatus and heated in a heating zone of the extrusion apparatus in order to then supply the fiber-reinforced plastic material to a—possibly exchangeable—extrusion nozzle of the extrusion apparatus, at which a material thread including (molten) fiber-reinforced plastic material is extruded for the component to be manufactured, and, in order to convey the fiber-reinforced plastic material through the heating zone, a screw conveyor of the extrusion apparatus is utilized, which has a length-diameter ratio of less than 10.

In accordance with the proposed solution, a volume of less than 5.5 $cm^3$ may be provided in the heating zone for the fiber-reinforced plastic material, and a rotational speed of the screw conveyor (about its longitudinal axis) may be limited to a maximum of 30 revolutions per minute.

Thus, the proposed solution—on the basis of experimentally gained findings—proceeds from the fundamental idea that for the extrusion of fiber-reinforced plastic material for the additive manufacture of a component on the one hand a screw conveyor (extruder screw) with a length-diameter ratio of less than 10 in combination with a volume limited to 5.5 $cm^3$ or less in the heating zone and a defined limited maximum rotational speed of the screw conveyor of 30 revolutions per minute or less is advantageous in order to additively manufacture a component with fiber-reinforced plastic material on the basis of extrusion. It was found that a degradation of the plastic material during the extrusion can effectively be avoided and at the same time an advantageous fiber orientation is achieved in the finished component, which has a positive effect on an increase of the material strength of the finished component. The limited rotational speed of the screw conveyor, e.g., a length-diameter ratio of less than 10 for the screw conveyor and a volume limited to 5.5 $cm^3$ or less for the fiber-reinforced plastic material in the heating zone, can also have a positive effect on the shear forces applied onto the plastic material via the screw conveyor during the extrusion so that comparatively long fibers are not sheared off and obtained in the finished component. The limited rotational speed of the screw conveyor leads to circumferential speeds (relevant for the shear rate) that are smaller than in conventional injection molding machines by a factor of 50 to 80.

In an embodiment, a volume in the range of 2.5 $cm^3$ to 5.5 $cm^3$, and in some cases 2.5 $cm^3$ to 4.5 $cm^3$, for the fiber-reinforced plastic material in the heating zone is provided. In one or more embodiments there is provided a volume in the range of 3.0 $cm^3$ to 3.5 $cm^3$, for example at about 3.30 $cm^3$. The volume that is provided for the fiber-reinforced plastic material in the heating zone of the extrusion apparatus here is calculated from the volume of a cavity that is formed in a housing portion defining the heating zone, and in which the screw conveyor extends, minus the volume occupied by the screw conveyor itself in the heating zone.

In an embodiment, a feed rate of the screw conveyor for the fiber-reinforced plastic material is set in such a way that the fiber-reinforced plastic material to be fed in the direction of the extrusion nozzle remains in the heating zone for a maximum of 20 minutes. The feed rate and/or the residence time here can be adjustable directly on the extrusion apparatus by taking account of the rotational speed of the screw conveyor limited to a maximum of 30 revolutions per minute. Alternatively, the feed rate and/or the residence time can be adjustable via a change in the rotational speed of the screw conveyor.

In dependence on the used plastic material and the form of the supplied raw material of fiber-reinforced plastic material, the feed rate of the screw conveyor can be set for a residence time of at least 1.5 seconds, and in some instances at least 4.75 seconds or 50 seconds, and for a maximum of 20 minutes of the fiber-reinforced plastic material to be fed in the heating zone. For example, in certain fiber-reinforced plastic materials a residence time in the range of 1.5 to about 60 seconds or several minutes was found to be advantageous when the fiber-reinforced plastic material is supplied to the extrusion apparatus in the form of a powder or as granules.

A feed rate of the plastic material can be set for example to a value of at least 5 cm$^3$ per hour and/or to a value of not more than 7500 cm$^3$ per hour. Thus, the screw conveyor can have a comparatively high output. For example, the feed rate can be set in the range of 10 cm$^3$ per hour to 5500 cm$^3$ per hour, e.g., in the range of 10 cm$^3$ per hour to 2500 cm$^3$ per hour, of 10 cm$^3$ per hour to 250 cm$^3$ per hour.

In an embodiment, the feed rate of the screw conveyor for the fiber-reinforced plastic material is set, for example, to a value in the range of 150 cm$^3$ per hour to 220 cm$^3$ per hour, and/or in the range of 150 cm$^3$ per hour to 200 cm$^3$ per hour. For example, for a feed rate of 10 cm$^3$ per hour and a volume of 3.3 cm$^3$ provided for the fiber-reinforced plastic material in the heating zone, a maximum residence time of the fiber-reinforced plastic material of below 20 min in the heating zone can be set.

The fiber-reinforced plastic material, for example, can include a thermoplastic matrix material and carbon fibers and/or glass fibers, and/or other aramide fibers and/or synthetic fibers and/or plastic-based fibers and/or natural fibers and/or ceramic fibers. Alternatively or additionally, the matrix material can include at least one of the following materials: polycarbonate, polylactate, polyethylene, polyethylene terephthalate, polymethylmethacrylate, polybutylene terephthalate, acrylonitrile-butadiene-styrene copolymer, polyoxymethylene, polypropylene, polystyrene, polyvinyl chloride, polyamide.

In an embodiment, the fiber-reinforced plastic material contains at least one additional reinforcing material, for example, made of flour and/or fragments. It may contain fragments of glass as an additional reinforcing material.

In an embodiment, the plastic material is supplied via a material supply at a feed zone of the extrusion apparatus. For example, there is provided a funnel-shaped inlet for the definition of the feed zone. At the feed zone, an intake section of the screw conveyor can be provided, from which by rotation of the screw conveyor about its (screw) longitudinal axis the fiber-reinforced, for example powdery or granular plastic material supplied at the feed zone is fed in the direction of the extrusion nozzle. Via screw flights of the screw conveyor, the fiber-reinforced plastic material here is entrained. The screw flights of the screw conveyor are configured in such a way that the plastic material undergoes no compression until reaching the heating zone. A compression via the screw conveyor then, for example, is provided only in a melting and compression zone of the screw conveyor, which is located in the area of the heating zone and effects a compression and, in combination with the heat supplied at the heating zone, melts of the plastic material. There may also be provided a change in pitch of the screw flights or a change in diameter of a shaft of the screw conveyor forming the screw flights.

The fiber-reinforced plastic material, as a composite material, may have a volume or mass percentage of reinforcing material, e.g., the fibers, of at least 10%.

Furthermore, in connection with the extrusion method an orientation of the fibers may be controlled by varying process parameters, such as the extrusion temperature, and/or a deposition of the fibers of the applied fiber-reinforced plastic material can be effected in such a way that two or more layers of the component to be manufactured, which are applied via a material thread, are connected to each other.

Another aspect of the proposed solution relates to an extrusion apparatus for extrusion of fiber-reinforced plastic material for the additive manufacture of a component.

The extrusion apparatus may include a heating zone in which the fiber-reinforced plastic material to be extruded is heated in order to then supply the fiber-reinforced plastic material to a (possibly exchangeable) extrusion nozzle of the extrusion apparatus at which a material thread with molten fiber-reinforced plastic material can be extruded for the component to be manufactured. Furthermore, the extrusion apparatus includes a screw conveyor for conveying the fiber-reinforced plastic material through the heating zone and in the direction of the extrusion nozzle, which has a length-diameter ratio of less than 10. According to the proposed solution, less than 5.5 cm$^3$ of volume are provided for the fiber-reinforced plastic material in the heating zone. An electronic control device of the extrusion apparatus may control a rotational speed of the screw conveyor and limit it to a maximum of 30 revolutions per minute in one or more embodiments.

The proposed extrusion apparatus provides a fast compression of plasticized, fiber-reinforced plastic material, which in turn prevents segregation and decomposition of the fiber-reinforced plastic material. During the extrusion, comparatively small shear forces acting on the plastic material to be extruded can be achieved. All in all, this allows a significant improvement in the additive manufacture of a component by a material thread made of fiber-reinforced plastic material extruded at the extrusion nozzle.

With an embodiment of a proposed extrusion apparatus, an embodiment of a proposed extrusion method can be executed. Thus, advantages and features described in connection with embodiments of a proposed extrusion method also apply for embodiments of a proposed extrusion apparatus, and vice versa.

Via the electronic control device of the extrusion apparatus, a feed rate of the screw conveyor can also be specified for the fiber-reinforced plastic material in such a way that the fiber-reinforced plastic material to be fed in the direction of the extrusion nozzle remains in the heating zone for a maximum of 30 minutes, e.g., between 1.5 seconds and 20 minutes.

Alternatively or additionally, a volumetric feed rate of the screw conveyor can be specified, for example, by the control device and can be specified with at least 5 cm$^3$ per hour and/or be limited to a maximum of 7500 cm$^3$ per hour. This may include an embodiment in which the electronic control device sets a feed rate to be not less than 10 cm$^3$ per hour and not more than 7500 cm$^3$ per hour. Alternatively, the controller may set a maximum of 5500 cm$^3$ per hour, 2500 cm$^3$ per hour, 1000 cm$^3$ hour, or 250 cm$^3$ per hour.

Via the electronic control device of the extrusion apparatus, for example, a volumetric feed rate of the screw conveyor can be preset for the fiber-reinforced plastic material (e.g., in the case of exchangeable housing portions for the formation of the heating zones), possibly in dependence on the supplied plastic material and/or in dependence on the provided volume within the heating zone. In this way, a user of the extrusion apparatus, for example, merely has to enter the kind and form of the supplied fiber-reinforced plastic material on an operating unit coupled with the control device, as a result of which the electronic control device then sets a particular feed rate on the basis of stored reference values (under the non-exceedable maximum speed of 30 revolutions per minute for the screw conveyor) in such a way that the residence time of the fiber-reinforced plastic material to be extruded in the heating zone remains under 20 minutes. Then, for example, the specified feed rate can vary in dependence on what thermoplastic material with what kind of fibers is supplied and/or whether the fiber-reinforced plastic material is supplied to the extrusion apparatus as a powder or as granules.

In an embodiment, the heating zone is limited to a maximum length of 40 mm and a maximum diameter of 25 mm. In this embodiment, the volume thereby provided for the fiber-reinforced plastic material is less than about 5.5 cm$^3$, depending on what volume is occupied by the screw conveyor within the heating zone.

In an embodiment, the screw conveyor includes a screw blade that rises in the conveying direction of the plastic material. The screw blade may have a slope of 7 mm to 17 mm, or 8 mm to 15 mm, for example. With such a configuration of the screw conveyor, in combination with the parameters specified on the basis of the proposed solution, it was found that in any case with fiber-reinforced plastic material including a thermoplastic matrix, which is supplied in the form of granules, advantageous orientations of the fibers in the finished component and also comparatively long fibers not sheared off can be achieved in the finished component.

In an embodiment, the heating zone has a conical taper at an end lying in the conveying direction of the plastic material, via which fiber-reinforced plastic material can be supplied to the extrusion nozzle. For example, this conical taper has an opening angle in the range of 50° to 65° or 55° to 60°, or at 58°. The degree of the taper may influence the material strength and fiber orientation on the component to be manufactured.

As explained already, the extrusion apparatus includes a feed zone that supplies the fiber-reinforced plastic material to the screw conveyor. In an embodiment, the heating zone follows a barrier zone in the conveying direction of the plastic material, which barrier zone spatially separates the heating zones from the feed zone of the extrusion apparatus. The barrier zone forms a thermal barrier between the feed zone and the heating zone. It may be advantageous that the barrier zone is formed by a housing portion made of a material that has a lower thermal conductivity than the material from which a housing portion adjoining the barrier zone is formed, by which the heating zone is formed at least in part, and the housing portion at least partly forming the heating zone has a larger thermal mass than the housing portion forming the barrier zone.

For example, the housing portion of the barrier zone consists of a high-strength or hard but thermally insulative material, for example ceramic material. Cooling can also be provided at the barrier zone in order to limit heating of the feed zone via the heating zone of the extrusion apparatus. In an embodiment, the barrier zone is made of zirconium oxide or aluminum oxide.

In an embodiment, a diameter of a shaft of the screw conveyor within the heating zone increases at least once in the conveying direction of the plastic material. For example, a conical increase of the diameter within the heating zone is provided in order to support the compression of the fiber-reinforced plastic material. The embodiment hence includes the fact that a diameter of the shaft at a first screw portion of the screw conveyor is a first (smaller) diameter, while at a second screw portion adjoining the latter in the conveying direction the shaft has a second (larger) diameter. Hence, the screw conveyor can be configured as a stuffing screw. For the increase in diameter between the first and the second screw portion, a conical transition area can be provided, for example, at which the diameter of the shaft of the screw conveyor increases in the conveying direction from the first diameter to the second diameter.

In an embodiment in which the diameter of a shaft of the screw conveyor within the heating zone, and, for example in a melting and compression zone of the screw conveyor, is conically increased with an angle in the range of 7° to 10° and up to 1.5 to 2 times a smallest (first) diameter of the shaft of the screw conveyor. In a development based thereon, the diameter then is constant up to an end of the screw conveyor lying in the conveying direction, in the region of an ejection zone of the screw conveyor.

In an embodiment it is provided, for example, that the heating zone extends along a conveying direction of the plastic material (specified by the screw conveyor) and parallel to a longitudinal axis of the screw conveyor with a length that maximally corresponds to half of a (total) length of the screw conveyor measured along the longitudinal axis. Thus, a heating zone length maximally is half as large as a length of the screw conveyor. Such a geometrical limitation of the heating zone length with respect to the total length of the screw conveyor was found to be advantageous in certain configurations with regard to the provided length-diameter ratio of the screw conveyor of less than 10, for example.

Alternatively or additionally, the screw conveyor with a melting and compression zone as well as an ejection zone following the latter in the conveying direction of the plastic material and including an axial end of the screw conveyors can extend within the heating zone, wherein the melting and compression zone and the ejection zone together do not exceed one third of a length of the screw conveyor measured along the longitudinal axis. The length of the part of the screw conveyor which forms the melting and compression zone as well as the ejection zone within the heating zone of the extrusion apparatus thus does not exceed ⅓ of the total length of the screw conveyor.

In this embodiment, a screw pitch of the screw conveyor in the melting and compression zone may be reduced with respect to an intake section of the screw conveyor, which is followed by the melting and compression zone in the conveying direction and at which the raw material of fiber-reinforced plastic material is supplied to the screw conveyor. With respect to the conveying direction of the plastic material within the extrusion apparatus, the melting and compression zone thus follows the feed zone along the screw longitudinal axis and in the direction of the extrusion nozzle, while the ejection zone follows the melting and compression zone.

In an embodiment, a reservoir is provided in a region between an axial end of the screw conveyor, which is located in the conveying direction of the plastic material, and the extrusion nozzle, in which molten fiber-reinforced plastic material can be maintained in a state of excess pressure. In the region, the extrusion apparatus may include a reservoir that is adapted and provided to maintain molten, fiber-reinforced plastic material in a state of excess pressure in operation of the extrusion apparatus, in order to make the plastic material exit at the extrusion nozzle as a material thread.

For example, the reservoir extends parallel to the conveying direction and parallel to the longitudinal axis of the screw conveyor with a length that maximally corresponds to one third of the length of the screw conveyor measured along the longitudinal axis. The reservoir length hence does not exceed ⅓ of the total length of the screw conveyor. For example, the reservoir has a maximum length of ¹⁄₁₅ of the length of the screw conveyor.

In an embodiment, the extrusion nozzle has a nozzle diameter in the range of 0.25 mm to 2 mm. For example, the extrusion nozzle may be exchangeable so that extrusion nozzles with different nozzle diameters, which each lie, e.g., in the range of 0.25 mm to 2 mm, can be utilized at the extrusion apparatus.

Another aspect of the proposed solution furthermore relates to a 3D printing device including at least an embodiment of a proposed extrusion apparatus and/or a 3D printing device including an extrusion apparatus for carrying out an embodiment of the proposed extrusion method. The 3D printing device can be adapted and provided for a thermoplastic melt layering method implemented by its extrusion apparatus, wherein the extrusion apparatus is used at least as part of a printing head of the 3D printing device on a triaxial kinematic system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An known a 3D printing device for the additive manufacture of metallic components is described in DE 10 2014 018 081 A1.

The use of screw extruders for the additive manufacture may be limited by their weight and their overall size, which typically depends on the length of the screw conveyor (extruder screw), as the screw extruders are either of traversable design or the entire working field is moved. The latter variant, however, requires making the entire 3D printing device distinctly oversize. Furthermore, in previously known extrusion methods for additive manufacture, it typically is to be observed that when processing fiber-reinforced plastic material a desired or even required material strength of the component to be manufactured can be realized only with difficulty or not at all.

Figure 1:
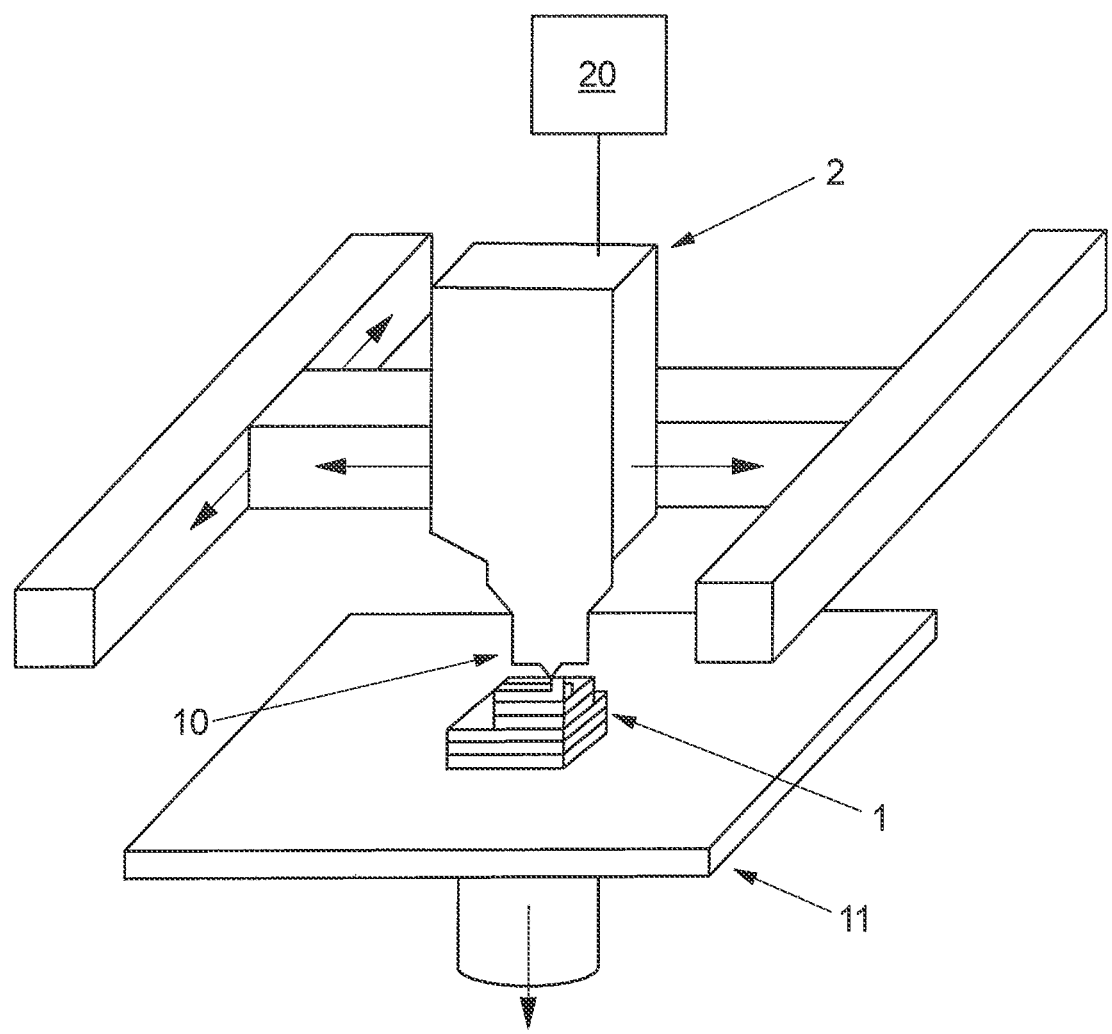
FIG. 1 shows a schematic representation of a 3D printing device for the additive processing of fiber-reinforced plastic materials by a compact screw extruder of the 3D printing device.

FIG. 1 shows a 3D printing device schematically and in a perspective view, in which an embodiment of a proposed extrusion apparatus in the form of a screw extruder 2 is provided as part of a printing head of the 3D printing device. By the screw extruder 2, fiber-reinforced plastic material can be used for the additive manufacture of a component 1 by way of thermoplastic melt layering. Via a triaxial kinematic system, the screw extruder 2 is traversable above a platform or base 11 on which the component 1 to be manufactured is formed. Material threads of molten fiber-reinforced plastic material are applied on the base 11 via an extrusion nozzle 10 of the screw extruder 2. The extrusion process is controlled via an electronic control device 20 of the screw extruder 2.

Figure 2:
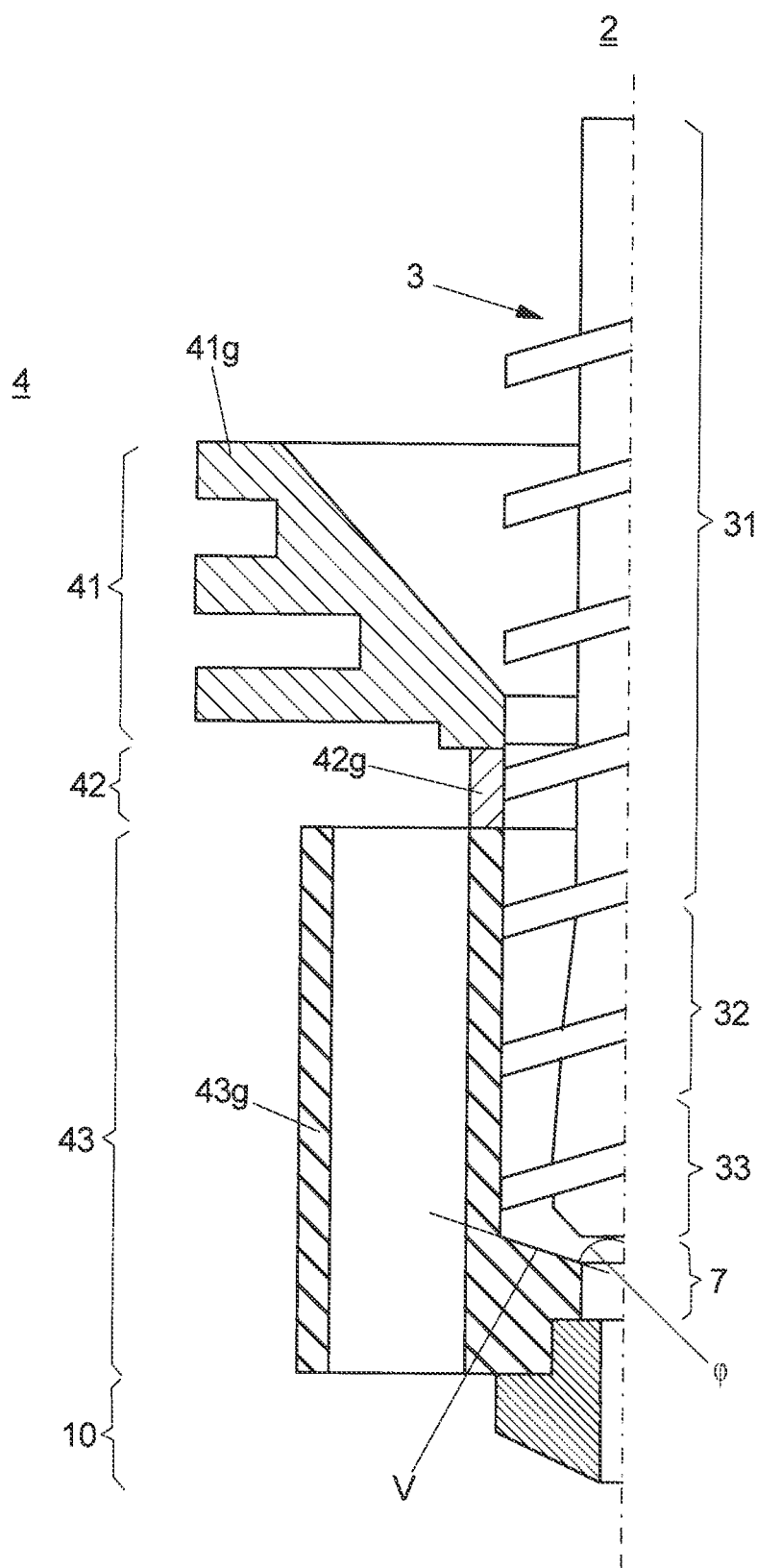
FIG. 2 shows a cross-sectional view of the screw extruder.
Figure 3:
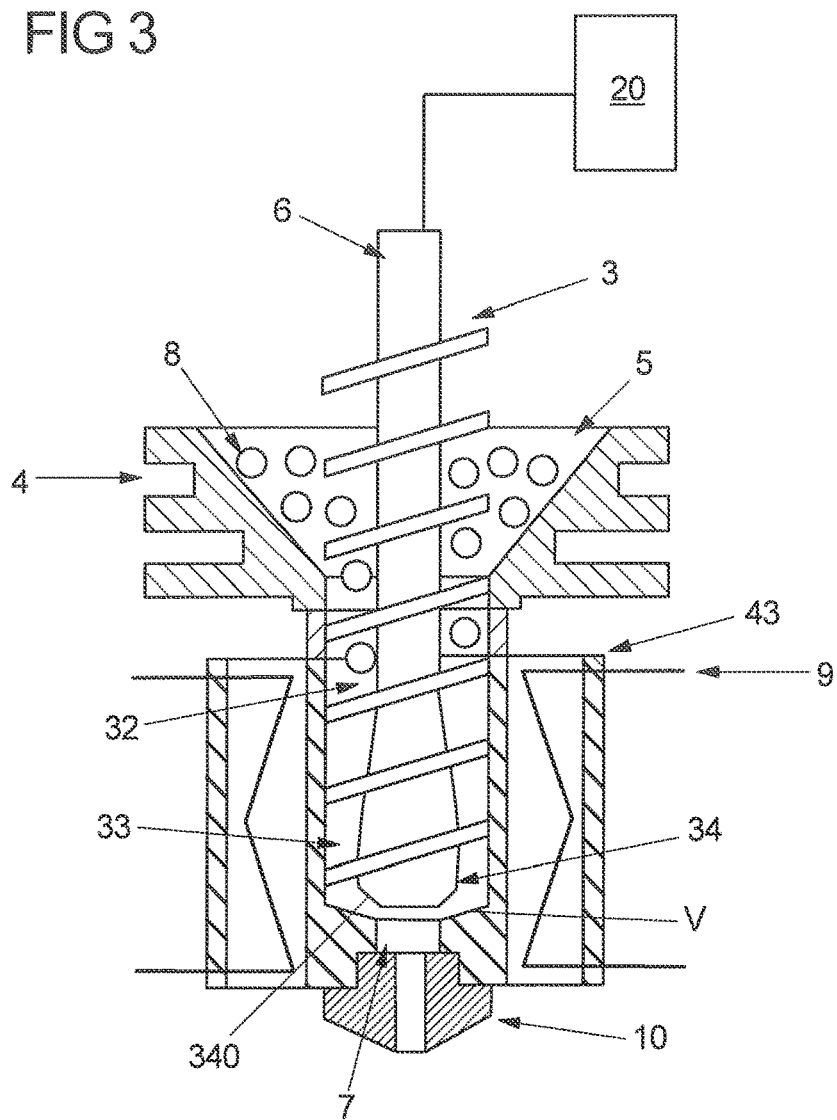
FIG. 3 shows another cross-sectional view of the screw extruder.
Figure 4:
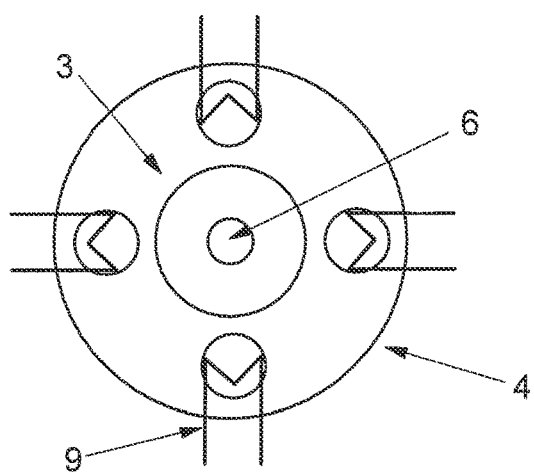
FIG. 4 shows a top view of the screw extruder.

As is illustrated for the screw extruder 2, with reference to the enlarged cross-sectional views of FIGS. 2 and 3 and with reference to the top view of FIG. 4, the screw extruder 2 includes a screw conveyor 3 for conveying fiber-reinforced plastic material 8, which is supplied in the form of powder or granules, in the direction of the extrusion nozzle 10. With a total length, this screw conveyor 3 extends along a (screw) longitudinal axis via an intake section 31, an adjoining melting and compression zone 32 up to an ejection nozzle 33. The screw conveyor 3 is accommodated in a housing 4 of the screw extruder 2 so as to be rotatable about its longitudinal axis and can be rotated via a non-illustrated motor drive.

In the cross-sectional view of FIGS. 2 and 3, the housing 4 at least partly accommodating the screw conveyor 3 is shown with different housing portions 41g, 42g and 43g. The individual housing portions 41g, 42g, 43g can also form independent housing parts that are interconnected and collectively define the housing 4. A first housing portion 41g defines a funnel-shaped inlet 5 for the supply of the powdery or granular fiber-reinforced plastic material 8, which as a composite material includes, for example, a thermoplastic matrix material with fibers embedded therein. In a conveying direction to the extrusion nozzle 10, the first housing portion 41g with the inlet 8, which defines a feed zone 41 for the supply of the plastic material, is adjoined by a second housing portion 42g for forming a thermal barrier zone 42. The barrier zone 42 separates the feed zone 41 from a heating zone 43, which is formed by a succeeding third housing portion 43g of the housing 4. For the thermal separation of the feed zone 41 from the heating zone 43, the second housing portion 42g is made, for example, from a high-strength, but thermally very poorly conductive, for example ceramic, material and possibly includes an additional intake cooling. For example, the housing portion 42g of the thermal barrier zone 42 is made of zirconium oxide or aluminum oxide.

For the configuration of the heating zone 43, the third housing portion 43g includes a heating element 9 or a plurality of heating elements 9 distributed around the circumference. The fiber-reinforced plastic material 8 conveyed in the direction of the extrusion nozzle 10 is molten by the heating elements 9 so that said plastic material can be extruded from the extrusion nozzle 10 in a material thread whose thickness is determined by the geometry of the extrusion nozzle 10 here exchangeably fixed to the housing 4.

The screw conveyor 3, which in the properly mounted condition is arranged vertically, extends within the housing 4 in such a way that the intake section 31 of the screw conveyor 3 is completely enclosed by the first housing portion 41g and the feed zone 41 formed thereby. Via the compression and melting zone 32 of the screw conveyor 3, which adjoins the feed zone 31, within the third housing portion 43g and hence within the heating zone 43, the plastic material 8 is compressed by the screw conveyor 3. The screw conveyor 3 therefor is configured as a stuffing screw in which the diameter of a shaft 6 of the screw conveyor 3 in the vicinity of the melting and compression zone 32 conically increases with an angle of 7° to 10° and up to 1.5 to 2 times a smallest diameter of the screw conveyor 3.

In an ejection zone 33 of the screw conveyor 3 adjoining the melting and compression zone 32, which likewise is still located within the heating zone 43, the (larger) diameter of the shaft 6 of the screw conveyor 3 remains constant. The ejection zone 33 and hence an axial end of the screw conveyor 3 is adjoined by a reservoir 7 in the conveying direction of the fiber-reinforced plastic material. This reservoir 7 is formed between the axial end of the screw conveyor 3 and the extrusion nozzle 10 and at least partly defined by a conical taper V of inner shell surfaces of the third housing portion 43g facing the screw conveyor 3 in the heating zone 43. In this reservoir 7, molten fiber-reinforced plastic material is maintained under excess pressure, the reservoir 7 here having a maximum length of 1/15 of a total length of the screw conveyor 3. The internally provided conical taper V in the third housing portion 43g in the direction of the extrusion nozzle 10 here has an opening angle $\varphi$ of 58° or more, for example.

In the illustrated screw extruder 2, the plastic material 8 initially is received in the funnel-shaped inlet 5 in the intake section 31 of the screw conveyor 3 and is transported downwards through the screw conveyor 3 along the conveying direction. Due to the thermal barrier zone 42 in the housing 4, the plastic material 8 flows freely up to the second housing portion 42g forming the barrier zone 42. Furthermore, it is provided that until reaching the heating zone 43 within the housing 4, there is no compression due to a change in pitch of the screw flights or a change in diameter of the shaft 6 of the screw conveyor 3.

It is only in the heating zone 43 directly adjoining the barrier zone 42 in downward direction that the plastic material 8 is molten and compressed. For this purpose, the radially arranged heating elements 9 are provided on the housing side of the heating zone 43, which heating elements extend along the entire length of the heating zone 43 and provide for a very local input of thermal energy. On the housing side, the heating zone 43 here maximally has a length that corresponds to half the length of the screw conveyor 3. The third housing portion 43g forming the heating zone 43 has a greater thermal conductivity than the second housing portion 42g forming the barrier zone 42 and also has a greater thermal mass with respect to this second housing portion 42g.

In the illustrated extrusion apparatus in the form of the screw extruder 2, the volume in the interior of the housing 4 provided in the heating zone 43 for fiber-reinforced plastic material 8 is limited to less than 5.5 cm$^3$, in the present case to about 3.30 cm$^3$. In other words, a maximum volume of 3.30 cm$^3$ is available in the heating zone 43 for the plastic material 8 to be conveyed along the longitudinal axis of the screw conveyor 3 in the direction of the extrusion nozzle 10. This volume is calculated from the difference of the cavity in the third housing portion 43g, in which the screw conveyor 3 extends with its melting and compression zone 32 and its ejection zone 33, and the volume occupied by the screw conveyor 3 itself Via the electronic control device 20, a maximum rotational speed of the screw conveyor 3 also is limited to 30 revolutions per minute about the (screw) longitudinal axis. Taking account of this speed limitation, a volumetric feed rate of the screw conveyor 3 here is set in such a way that the fiber-reinforced plastic material 8 to be conveyed in the direction of the extrusion nozzle 10 remains in the heating zone 43 for a maximum of 20 minutes, here e.g., for at least 1.5 seconds, but not more than 20 minutes. In the present case, a simultaneously comparatively high output of the screw conveyor 3 in the range of up to 7500 cm$^3$ per hour, such as 5500 cm$^3$ per hour, 2500 cm$^3$ per hour, 1000 cm$^3$ per hour or 250 cm$^3$ per hour is achieved. Combined with a length-diameter ratio of the screw conveyor 3 of below 10 it is achieved that the fiber-reinforced plastic material 8 remains in the heating zone 43 for a comparatively short period, whereby a degradation of the plastic material 8 is avoided. This is also promoted by the configuration of the heating zone 43 with a maximum length of 24 mm and a diameter of less than 18 mm. In addition, it was found that in an extrusion method implemented with the screw extruder 2 corresponding to the above-mentioned process parameters, fibers contained in the powdery or granular plastic material 8 are sheared off only for a comparatively small portion and about 70% of the fibers are deposited in the direction of movement of the extrusion nozzle 10. This allows to influence the fiber orientation and hence the strength of the component 1 to be manufactured regardless of the component geometry. In a 3D printing process, merely the path of movement of the extrusion nozzle 10 has to be manipulated.

The throughput time in the heating zone 43 and along the melting and compression zone 32 of the screw conveyor 3 in principle is dependent on the fiber-reinforced plastic material 8 used. Corresponding to the proposed solution, the maximum rotational speed of the screw conveyor 3 is limited to a maximum of 30 revolutions per minute. In combination with the length-diameter ratio of the screw conveyor 3 of less than 10 this provides low shear forces, and the throughput time is chosen such that the residence time of the plastic material 8 in the heating zone is not more than 20 minutes. Due to the short residence time, which, for example, is also fixed by the feed rate, of the amount of plastic material 8 of less than 5.5 cm$^3$, which is kept small by definition as a result of the specified volume, in the heating zone 43 of geometrically comparatively short design (in particular relative to the length of the screw conveyor 3), the plastic material 8 remains in the hot state only briefly and the melt kept in stock in the melting and compression zone 32 has a sufficiently short throughput time.

The compact screw extruder 2 shown in FIGS. 1 to 4 is capable of processing fiber-reinforced plastic material 8, which, for example, contains at least one of the following matrix materials: polycarbonate, polylactate, polyethylene, polyethylene terephthalate, polymethylmethacrylate, polybutylene terephthalate, acrylonitrile-butadiene-styrene copolymer, polyoxymethylene, polypropylene, polystyrene, polyvinyl chloride, polyamide. Furthermore, various reinforcing materials in the form of glass fibers, aramide fibers, steel fibers, carbon fibers, synthetic fibers, plastic-based fibers, natural fibers, and/or ceramic fibers can be embedded in the matrix material. As additional reinforcements, flour or fragments of glass or other materials can also be utilized. The plastic material can also be mineral-reinforced.

In an application scenario, the fiber-reinforced plastic material 8 has a fiber content of greater than or equal to 10%, without containing any endless fibers.

Figure 5:
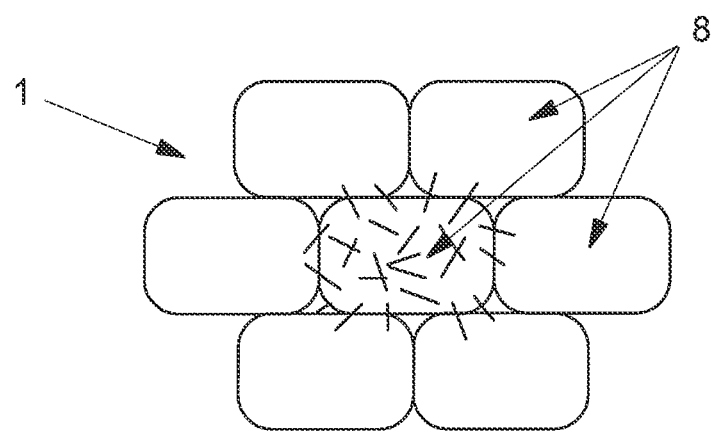
FIG. 5 shows a schematic representation of a mechanical interlocking of material threads/webs made of extruded fiber-reinforced plastic material, which are deposited by the screw extruder.

By the screw extruder 2 or the 3D printing device, in which the screw extruder 2 forms part of a printing head, a component 1 can effectively be manufactured additively. For example, corresponding to the schematic representation of FIG. 5, layers (material webs) containing 70% of fibers that are deposited in the direction of movement of the extrusion nozzle 10 can be applied for the component 1 by extruded material threads of fiber-reinforced plastic material 8 by using the extrusion process implemented with the screw extruder 2. The remaining 30% of the fibers protrude from the applied (printed) layers in all directions in space, which results in a mechanical interlocking between the layers deposited on each other. In this way, a comparatively high material strength is achieved in the finished component 1 and a deformation behavior of the finished component 1 can be specified in a targeted way.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 component
10 extrusion nozzle
11 base
2 screw extruder (extrusion apparatus)
20 control device
3 screw conveyor/extruder screw
31 intake section
32 melting and compression zone
33 ejection zone
34 end region
340 chamfer
4 housing
41 feed zone
42 (thermal) barrier zone
41g, 42g, 43g housing portion
43 heating zone
5 inlet
6 shaft
7 reservoir
8 fiber-reinforced plastic material
9 heating element
V taper
φ opening angle

The invention claimed is:

1. A method for extrusion of fiber-reinforced plastic material for additive manufacture of a component comprising:
supplying a fiber-reinforced plastic material to an extrusion apparatus;
heating the fiber-reinforced plastic material in a heating zone of the extrusion apparatus;
supplying the heated fiber-reinforced plastic material to an extrusion nozzle of the extrusion apparatus, at which a material thread including the fiber-reinforced plastic material is extruded for a component to be manufactured; and
conveying the fiber-reinforced plastic material through the heating zone via a screw conveyor of the extrusion apparatus, wherein the screw conveyor has a length-diameter ratio of less than 10;
wherein:
in the heating zone, a maximum of 5.5 cm$^3$ of volume is provided for the fiber-reinforced plastic material and a rotational speed of the screw conveyor is limited to a maximum of 30 revolutions per minute;
the fiber-reinforced plastic material is supplied to the screw conveyor at a feed zone of the extrusion apparatus;
the extrusion apparatus further comprises a barrier zone that, in a conveying direction of the fiber-reinforced plastic material, follows the feed zone to spatially separate the feed zone from the heating zone;
the barrier zone is formed by a first housing portion made of a first material that has a lower thermal conductivity than a second material from which a second housing portion is made, the second housing portion adjoining the barrier zone and at least partly forming the heating zone; and
the second housing portion at least partly forming the heating zone has a larger thermal mass than the first housing portion forming the barrier zone.

2. The method according to claim 1, wherein the volume provided for the fiber-reinforced plastic material in the heating zone is in a range of 2.5 cm$^3$ to 5.5 cm$^3$.

3. The method according to claim 2, wherein the volume provided for the fiber-reinforced plastic material is in a range of 3.0 cm$^3$ to 3.5 cm$^3$.

4. The method according to claim 1, wherein a feed rate of the screw conveyor is set for the fiber-reinforced plastic material such that the fiber-reinforced plastic material remains in the heating zone for a maximum of 20 minutes.

5. The method according to claim 1, wherein a feed rate of the screw conveyor is set for the fiber-reinforced plastic material such that the fiber-reinforced plastic material remains in the heating zone for at least 0.5 seconds and for a maximum of 30 minutes.

6. The method according to claim 1, wherein a feed rate of the screw conveyor for the fiber-reinforced plastic material is set to a value of at least 5 cm$^3$/h.

7. The method according to claim 6, wherein the feed rate of the screw conveyor for the fiber-reinforced plastic material is set to the value of not more than 7500 cm$^3$/h.

8. The method according to claim 7, wherein the feed rate of the screw conveyor for the fiber-reinforced plastic material is set to the value less than 250 cm$^3$/h.

9. The method according to claim 8, wherein the feed rate of the screw conveyor for the fiber-reinforced plastic material is set to the value in the range of 150 cm$^3$/h to 220 cm$^3$/h.

10. The method according to claim 1, wherein the fiber-reinforced plastic material includes a thermoplastic matrix material and carbon fibers, glass fibers, aramide fibers, synthetic fibers, plastic-based fibers, natural fibers, and/or ceramic fibers.

11. The method according to claim 1, wherein the reinforcing material of the fiber-reinforced plastic material contains flour and/or fragments of a reinforcing material.

12. An extrusion apparatus for extrusion of fiber-reinforced plastic material for additive manufacture of a component, the extrusion apparatus comprising:
an extrusion nozzle;
a heating zone configured to heat a fiber-reinforced plastic material to be extruded and configured to then supply the heated fiber-reinforced plastic material to the extrusion nozzle, at which a material thread including fiber-reinforced plastic material can be extruded for the component to be manufactured, wherein, in the heating zone, a maximum of 5.5 cm$^3$ of volume is provided for the fiber-reinforced plastic material;
a screw conveyor having a length-diameter ratio of less than 10 and configured to convey the fiber-reinforced plastic material through the heating zone, wherein a rotational speed of the screw conveyor is limited to a maximum of 30 revolutions per minute via an electronic control device of the extrusion apparatus;

a feed zone at which the fiber-reinforced plastic material is supplied to the screw conveyor; and a barrier zone that, in a conveying direction of the fiber-reinforced plastic material, follows the feed zone to spatially separate the feed zone from the heating zone, the barrier zone being formed by a first housing portion made of a first material that has a lower thermal conductivity than a second material;

wherein a second housing portion made from the second material adjoins the barrier zone and at least partly forms the heating zone, the second housing portion having a larger thermal mass than the first housing portion forming the barrier zone.

13. The extrusion apparatus according to claim 12, wherein the electronic control device is configured to set a feed rate of the screw conveyor such that the fiber-reinforced plastic material to be fed in a direction of the extrusion nozzle remains in the heating zone for a maximum of 20 minutes.

14. The extrusion apparatus according to claim 12, wherein at least one of the heating zone has a maximum length of 40 mm and a maximum diameter of 25 mm, the screw conveyor has a screw blade rising in a conveying direction of the plastic material with a slope of 7 mm to 17 mm, and at an end located in the conveying direction of the plastic material, the heating zone has a conical taper via which fiber-reinforced plastic material is supplied to the extrusion nozzle, and the conical taper includes an opening angle in the range of 50° to 65°.

15. The extrusion apparatus according to claim 12, wherein a diameter of a shaft of the screw conveyor within the heating zone increases at least once in a conveying direction of the plastic material.

16. The extrusion apparatus according to claim 12, wherein the heating zone extends along a conveying direction of the plastic material and parallel to a longitudinal axis of the screw conveyor with a length that maximally corresponds to half of a length of the screw conveyor measured along the longitudinal axis.

17. The extrusion apparatus according to claim 12, wherein the screw conveyor with a melting and compression zone and an ejection zone following the melting and compression zone in a conveying direction of the plastic material and including an axial end of the screw conveyor extends within the heating zone, and the melting and compression zone and the ejection zone together do not exceed one third of a length of the screw conveyor measured along a longitudinal axis of the screw conveyor.

18. The extrusion apparatus according to claim 12, wherein, in a region between an axial end of the screw conveyor that is located in a conveying direction of the plastic material and the extrusion nozzle, a reservoir is provided, in which molten fiber-reinforced plastic material is maintained in a state of excess pressure.

19. A 3D printing device comprising:

an extrusion apparatus for extrusion of fiber-reinforced plastic material for additive manufacture of a component, the extrusion apparatus including:

an extrusion nozzle;

a heating zone configured to heat a fiber-reinforced plastic material to be extruded and configured to then supply the fiber-reinforced plastic material to the extrusion nozzle, at which a material thread including fiber-reinforced plastic material can be extruded for the component to be manufactured, wherein, in the heating zone, a maximum of 5.5 cm$^3$ of volume is provided for the fiber-reinforced plastic material;

a screw conveyor having a length-diameter ratio of less than 10 and configured to convey the fiber-reinforced plastic material through the heating zone, wherein a rotational speed of the screw conveyor is limited to a maximum of 30 revolutions per minute via an electronic control device of the extrusion apparatus;

a feed zone at which the fiber-reinforced plastic material is supplied to the screw conveyor; and a barrier zone that, in a conveying direction of the fiber-reinforced plastic material, follows the feed zone to spatially separate the feed zone from the heating zone, the barrier zone being formed by a first housing portion made of a first material that has a lower thermal conductivity than a second material;

wherein a second housing portion made from the second material adjoins the barrier zone and at least partly forms the heating zone, the second housing portion having a larger thermal mass than the first housing portion forming the barrier zone.

* * * * *